United States Patent
Yoshida et al.

(10) Patent No.: US 9,817,463 B2
(45) Date of Patent: Nov. 14, 2017

(54) INFORMATION PROCESSING APPARATUS, INFORMATION PROCESSING METHOD, AND RECORDING MEDIUM, CONFIGURED TO PERFORM SHUTDOWN PROCESS IN ENERGY SAVING MODE

(71) Applicants: Kazuki Yoshida, Kanagawa (JP); Takashi Soyama, Kanagawa (JP); Yohsuke Utoh, Kanagawa (JP); Genki Watanabe, Kanagawa (JP)

(72) Inventors: Kazuki Yoshida, Kanagawa (JP); Takashi Soyama, Kanagawa (JP); Yohsuke Utoh, Kanagawa (JP); Genki Watanabe, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 193 days.

(21) Appl. No.: 14/708,708

(22) Filed: May 11, 2015

(65) Prior Publication Data
US 2015/0338898 A1    Nov. 26, 2015

(30) Foreign Application Priority Data
May 23, 2014  (JP) .................. 2014-107157

(51) Int. Cl.
*G06F 1/32* (2006.01)
*G03G 15/00* (2006.01)
(Continued)

(52) U.S. Cl.
CPC ............ *G06F 1/3206* (2013.01); *B41J 29/38* (2013.01); *B41J 29/42* (2013.01);
(Continued)

(58) Field of Classification Search
None
See application file for complete search history.

(56) References Cited

U.S. PATENT DOCUMENTS

| 8,605,304 B2 | 12/2013 | Yanazume et al. |
| 2006/0007469 A1* | 1/2006 | Uruma .............. H04N 1/0035 358/1.14 |

(Continued)

FOREIGN PATENT DOCUMENTS

| CN | 1731298 A | 2/2006 |
| JP | 2006-021501 | 1/2006 |

(Continued)

OTHER PUBLICATIONS

Chinese official action dated Jul. 27, 2017 in connection with corresponding Chinese patent application No. 2015102549785.

*Primary Examiner* — Kim Huynh
*Assistant Examiner* — Joshua Neveln
(74) *Attorney, Agent, or Firm* — Cooper & Dunham LLP

(57) ABSTRACT

An information processing apparatus includes a processor configured to shift to an energy saving mode in which predetermined functions are inactivated. The processor includes a detection unit that detects a shutdown operation in the energy saving mode of the information processing apparatus, an operation reception unit that displays, when the shutdown operation is detected, a screen in which a user is prompted to determine whether performance of a shutdown process is to be continued, the operation reception unit receiving an operation through the screen, and a shutdown unit that performs the shutdown process when an operation to continue performance of the shutdown process is received through the screen.

5 Claims, 4 Drawing Sheets

(51) Int. Cl.
*G06F 3/12* (2006.01)
*B41J 29/28* (2006.01)
*H04N 1/00* (2006.01)
*B41J 29/42* (2006.01)
*B41J 29/38* (2006.01)

(52) U.S. Cl.
CPC ....... *G03G 15/5004* (2013.01); *G06F 1/3228* (2013.01); *G06F 3/12* (2013.01); *H04N 1/00* (2013.01)

(56) References Cited

U.S. PATENT DOCUMENTS

| 2008/0168290 | A1* | 7/2008 | Jobs ...................... G06F 1/26 713/324 |
| 2012/0235475 | A1 | 9/2012 | Iwata |
| 2014/0300921 | A1 | 10/2014 | Utoh et al. |

FOREIGN PATENT DOCUMENTS

| JP | 2011-170763 | 9/2011 |
| JP | 2012-161023 | 8/2012 |
| JP | 2012-199030 | 10/2012 |
| JP | 2014-201039 | 10/2014 |

\* cited by examiner

INFORMATION PROCESSING APPARATUS, INFORMATION PROCESSING METHOD, AND RECORDING MEDIUM, CONFIGURED TO PERFORM SHUTDOWN PROCESS IN ENERGY SAVING MODE

BACKGROUND OF THE INVENTION

1. Field of the Invention

The present invention relates to an information processing apparatus, an information processing method, and a recording medium.

2. Description of the Related Art

To turn off a power supply of an information processing apparatus, a user is required to press a power switch thereof. However, if the power supply is turned off during execution of some process in the information processing apparatus, there is a possibility that malfunctions, such as loss of internal data and failure of hardware, take place. A method for preventing such malfunctions is known in the related art, by which a preparatory process is started when the power switch is pressed, in order to terminate some process during execution, and the power supply is turned off after the execution of the preparatory process is completed.

SUMMARY OF THE INVENTION

In one aspect, the present invention provides an information processing apparatus, an information processing method, and a recording medium which are capable of preventing a hardware shutdown process from being started due to a misoperation during an energy saving mode or the like.

In an embodiment which solves or reduces one or more of the above-described problems, the present invention provides an information processing apparatus including a processor configured to shift to an energy saving mode in which predetermined function are inactivated, the processor including: a detection unit configured to detect a shutdown operation in the energy saving mode of the information processing apparatus; an operation reception unit configured to display, when the shutdown operation is detected, a screen in which a user is prompted to determine whether performance of a shutdown process is to be continued, the operation reception unit receiving an operation through the screen; and a shutdown unit configured to perform the shutdown process when an operation to continue performance of the shutdown process is received through the screen.

Other objects, features and advantages of the present invention will become more apparent from the following detailed description when read in conjunction with the accompanying drawings.

DETAILED DESCRIPTION OF THE PREFERRED EMBODIMENTS

A description will be given of embodiments with reference to the accompanying drawings.

In the following, an image forming apparatus will be described as an example of an information processing apparatus according to the invention, and the information processing apparatus according to the invention should not be construed as being limited to the image forming apparatus.

An image forming apparatus 1 according to an embodiment is configured to shift to an energy saving mode in which one or more functions of the image forming apparatus 1 are inactivated to reduce power consumption. If a power switch or the like is pressed in the image forming apparatus 1 which has shifted to the energy saving mode, a confirmation screen is displayed in which a user is prompted to determine whether performance of a shutdown process is to be continued. If a user's operation to continue performance of the shutdown process is received, the image forming apparatus 1 is controlled to perform the shutdown process.

Figure 1:
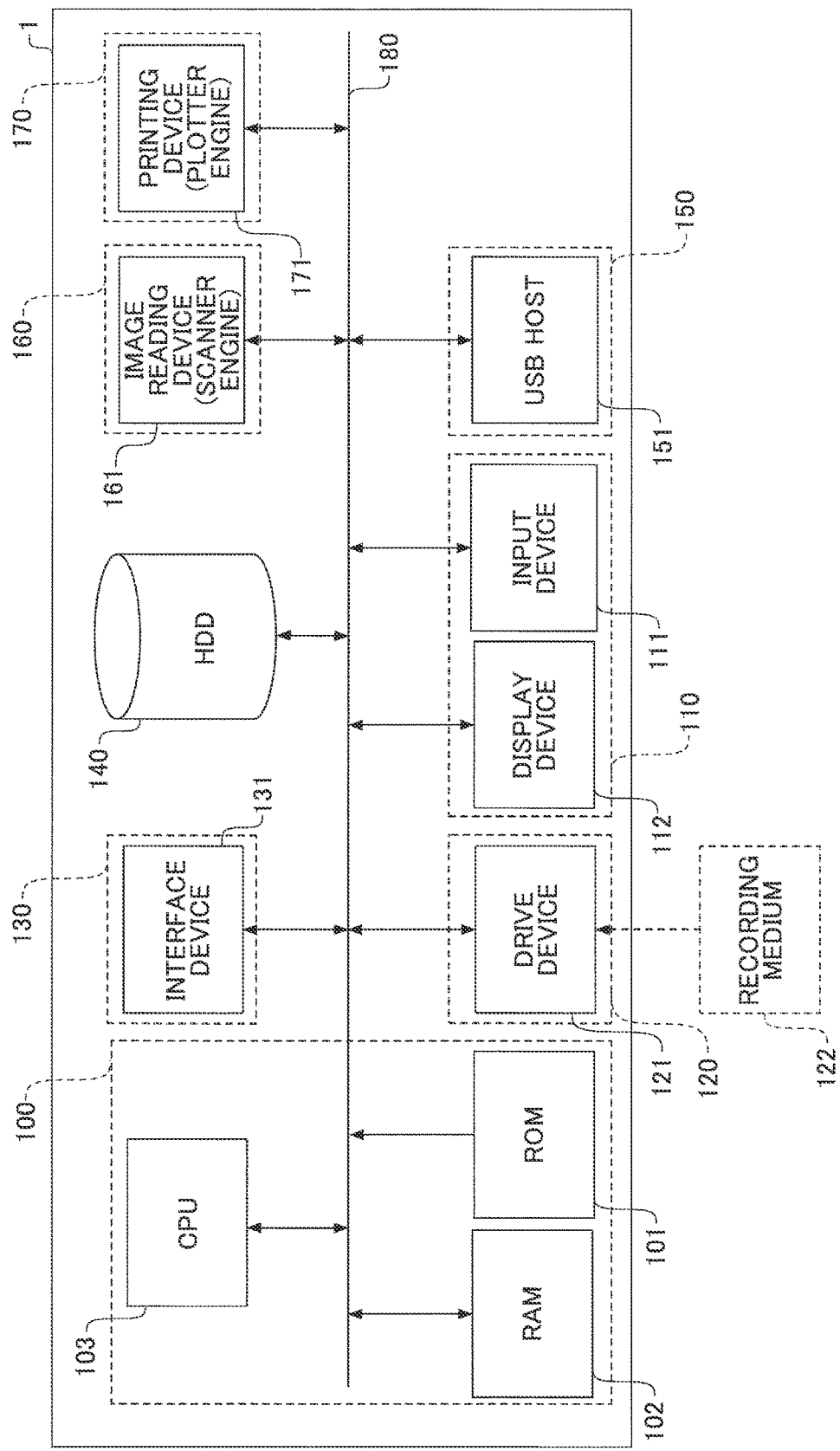
FIG. 1 is a diagram showing a hardware configuration of an image forming apparatus according to an embodiment.

FIG. 1 is a diagram showing a hardware configuration of the image forming apparatus 1 according to the embodiment. As shown in FIG. 1, the image forming apparatus 1 includes a controller 100, an operation panel 110, a recording-medium interface 120, a data communication interface 130, an HDD (hard disk drive) 140, a USB (universal serial bus) interface 150, a scanner 160, and a plotter 170. These components 100-170 of the image forming apparatus 1 are interconnected by a PCI (peripheral component interconnect) bus 180.

The controller 100 includes a ROM (read-only memory) 101, a RAM (random access memory) 102, and a CPU (central processing unit) 103. The CPU 103 is an example of a processor provided in the image forming apparatus 1. The ROM 101 stores programs which are performed when the image forming apparatus 1 is started, and various data. The RAM 102 temporarily stores various programs and data which are read out from the ROM 101 or the HDD 140.

The operation panel 110 includes an input device 111 and a display device 112. The input device 111 includes a set of hardware keys and others, and the input device 111 is used to input an operation signal to the image forming apparatus 1. The display device 112 includes a display and displays, for example, a variety of information items related to image formation operations.

The recording-medium interface 120 includes a drive device 121. If a recording medium 122 is placed in the drive device 121, various recorded data from the recording medium 122 is stored into the HDD 140 through the drive device 121.

The data communication interface 130 includes an interface device 131. The data communication interface 130 is an interface which connects the image forming apparatus 1 to a data transmission line of a network.

The HDD 140 stores various data including received document data, read image data, etc., which are dealt with by the image forming apparatus 1. Moreover, the HDD 140 manages these various data by using a predetermined file system or database.

The USB interface 130 includes a USB host 151, and this USB host 151 connects the image forming apparatus 1 to various devices through a USB cable. The USB host 151 has a function to control physical and electric interfaces for allowing the image forming apparatus 1 to communicate with various devices, and a function to control a USB (universal serial bus) protocol.

The scanner 160 includes an image scanner 161 (scanner engine), and this image scanner 161 optically reads a document placed on a reading surface of the scanner 160, and generates image data.

The plotter 170 includes a printing device 171 (plotter engine). For example, the printing device 171 prints a bitmapped image on a recording sheet by using an electrophotographic printing method.

An example of the image forming apparatus 1 may be an MFP (multifunction peripheral) equipped with an image formation capability, a data communication capability, etc., which provides multiple functions including a scanner function, a copier function, a printer function, facsimile transmit/receive functions and others.

Figure 2:
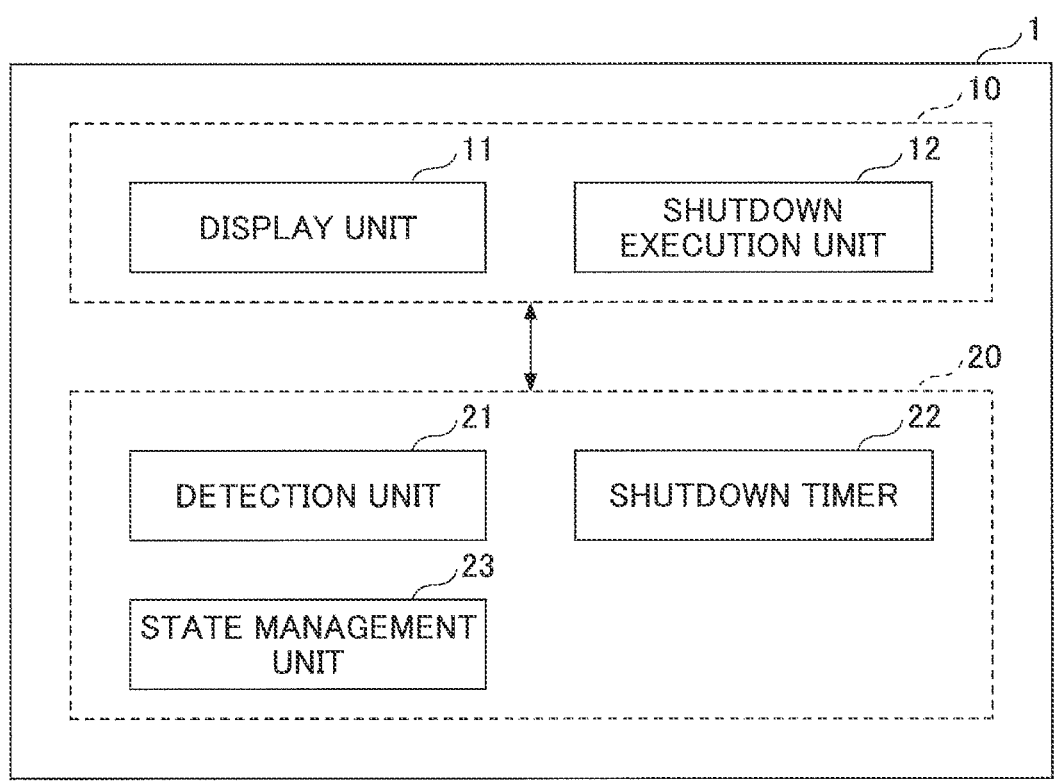
FIG. 2 is a diagram showing a functional configuration of the image forming apparatus according to the embodiment.

FIG. 2 is a diagram showing a functional configuration of the image forming apparatus 1 according to the embodiment. As shown in FIG. 2, the image forming apparatus 1 includes a device management application 10 and a kernel 20.

The device management application 10 is configured to start execution of applications and perform a shutdown process or the like in accordance with instructions received from the kernel 20. The device management application 10 is configured to control the hardware of the image forming apparatus 1, such as a power switch, through the kernel 20. The device management application 10 may include a display unit 11 and a shutdown execution unit 12.

The kernel 20 may be a computer program or middleware which mediates data processing between applications and the hardware components of the image forming apparatus 1. Specifically, the kernel 20 is configured to control the hardware through the application in accordance with a request received from the user. Moreover, the kernel 20 is configured to detect a user's operation on the hardware, such as a depression of the power switch, and start execution of a relevant application in response to the detection of the user's operation. The kernel 20 may include a detection unit 21, a shutdown timer management unit 22, and a state management unit 23.

Next, the functions of the device management application 10 will be described.

Figure 3:
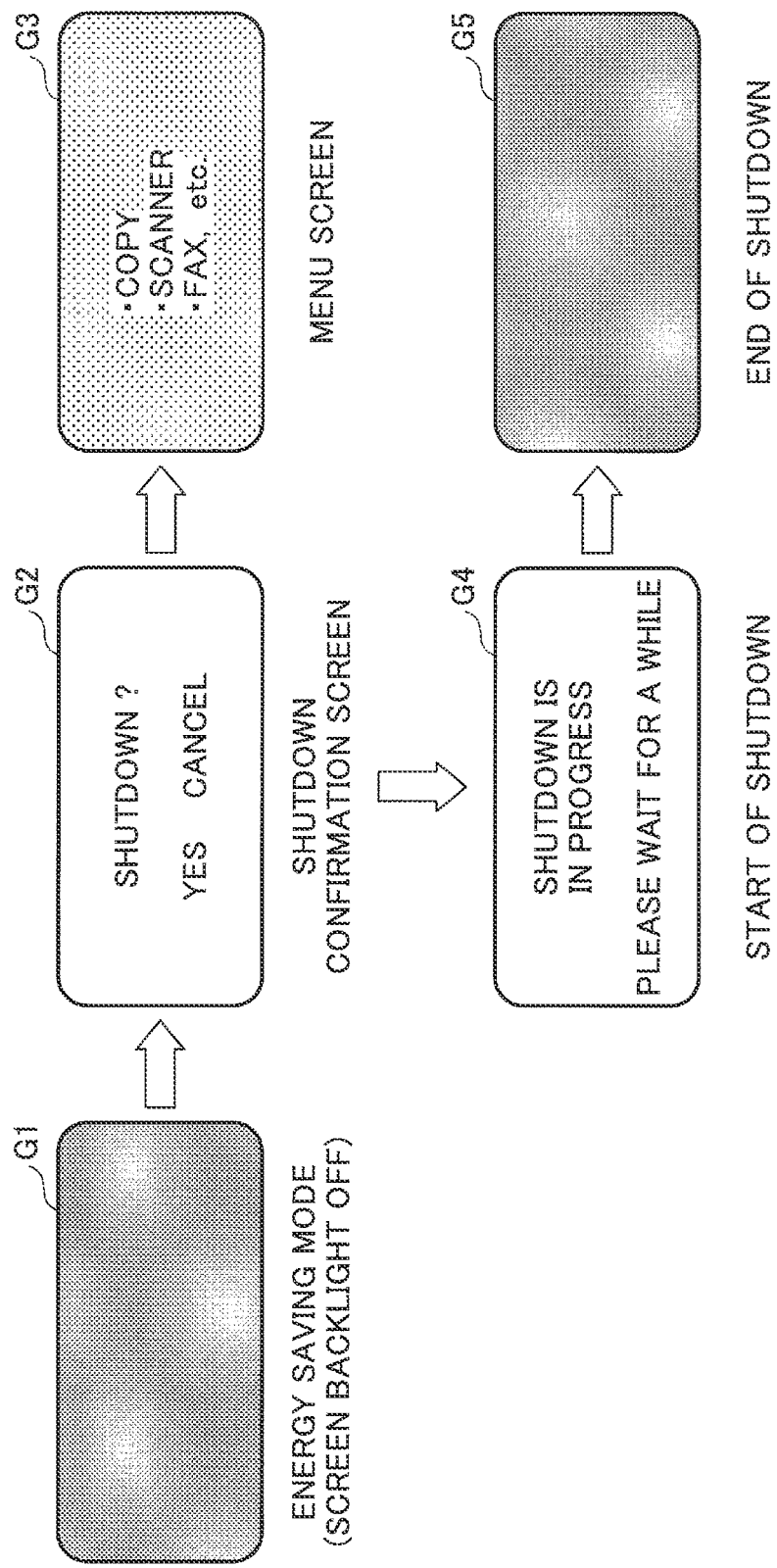
FIG. 3 is a diagram showing a transition of display screens displayed by the image forming apparatus according to the embodiment.

When the detection unit 21 of the kernel 20 detects a depression of the power switch by a user during the energy saving mode, the display unit 11 of the device management application 10 displays on the display device 112 a confirmation screen in which the user is prompted to determine whether performance of a shutdown process is to be continued, and receives a user's operation through the confirmation screen. Moreover, the display unit 11 effects a transition of display screens according to a user's operation and a state of the shutdown process executed. FIG. 3 is a diagram showing a transition of display screens displayed by the image forming apparatus 1 according to the embodiment.

As shown in FIG. 3, when the image forming apparatus 1 is controlled to shift to the energy saving mode, the screen backlight of the display device is turned off (G1).

The image forming apparatus 1 displays a shutdown confirmation screen when a user's depression of the power switch during the energy saving mode is detected through the detection unit 21 (G2).

When a user's operation to discontinue performance of the shutdown process (CANCEL in the screen G2) is received through the shutdown confirmation screen, the power supply state of the image forming apparatus 1 is controlled to change from the energy saving mode to a normal mode. In the normal mode, the image forming apparatus 1 displays a menu screen in which a user's operation to select one of the multiple functions of the image forming apparatus 1, such as a copier function, may be received (G3).

When a user's operation to continue performance of the shutdown process (YES in the screen G2) is received through the shutdown confirmation screen, or when a predetermined period of time has passed after the shutdown confirmation screen is displayed, the display unit 11 displays a shutdown start screen in which the user is notified of a start of performance of the shutdown process (G4). Subsequently, the power supply of the image forming apparatus 1 is shut down (G5).

Referring back to FIG. 2, when the display unit 11 receives a user's operation to continue performance of the shutdown process, the shutdown execution unit 12 stores data during execution, and then instructs the state management unit 23 to inactivate the hardware of the image forming apparatus 1. The shutdown execution unit 12 is configured to perform a software shutdown process.

Next, the functions of the kernel 20 will be described.

After the image forming apparatus 1 has shifted to the energy saving mode, the detection unit 21 detects whether the power switch of the image forming apparatus 1 is pressed by the user.

The shutdown timer management unit 22 manages operation of a shutdown timer, such as starting or stopping of the shutdown timer, and setting of a timer value in the shutdown timer. The shutdown timer is started when a user's shutdown operation such as a depression of the power button is performed during operation of the image forming apparatus 1. When the shutdown timer has expired, performance of a hardware shutdown process is started.

For example, the shutdown timer management unit 22 controls the shutdown timer to decrement from a predetermined timer value, and detects the shutdown timer expiration when the timer value obtained by the decrementing is equal to 0. Alternatively, the shutdown timer management unit 22 may control the shutdown timer to increment from a timer value which is initially set to 0, and detect the shutdown timer expiration when the timer value obtained by the incrementing reaches a predetermined value.

The shutdown timer management unit 22 starts the shutdown timer when the detection unit 21 detects a user's depression of the power switch during the energy saving mode. The shutdown timer management unit 22 resets the timer value of the shutdown timer or stops the shutdown timer when the display unit 11 receives a user's operation to discontinue performance of the shutdown process.

After the display unit 11 displays the shutdown confirmation screen, the shutdown timer management unit 22 extends the time (timer value) of the shutdown timer. For example, extension of the time of the shutdown timer is performed by adding a predetermined value to the timer value of the shutdown timer obtained by the decrementing. The predetermined value to be added to the timer value may be equivalent to a time needed for the user to perform a shutdown process continuation or discontinuation operation on the shutdown confirmation screen.

The shutdown timer management unit 22 may be configured to store in advance both a first shutdown timer value for use when the power switch is pressed during the energy saving mode and a second shutdown timer value for use when the power switch is pressed during the normal mode. In this case, it is preferred that the first shutdown timer value for use in the energy saving mode is greater than the second shutdown timer value for use in the normal mode.

When the shutdown timer has expired, the shutdown timer management unit 22 may request the state management unit 23 to start performing the hardware shutdown process so that each of the hardware components may be stopped according to a predetermined sequence and the power supply of the image forming apparatus 1 may be shut down. In addition, the shutdown timer management unit 22 is configured so that, even if the power switch is pressed in a state where the shutdown confirmation screen is displayed, the shutdown timer management unit 22 does not serve to extend the time of the shutdown timer again.

The state management unit 23 is configured to control a state of each of the hardware components of the image forming apparatus 1. For example, when no job execution request is input to the image forming apparatus 1 over a predetermined period of time, the state management unit 23 inactivates the predetermined hardware components and controls the image forming apparatus 1 to shift to the energy saving mode.

When a user's operation to continue performance of the shutdown process is received, the state management unit 23 inactivates each of the hardware components according to the instructions of the shutdown execution unit 12, so that the power supply of the image forming apparatus 1 is shut down.

When the shutdown timer has expired, the state management unit 23 determines that the software shutdown process has failed, even if the software shutdown process is being operated by the shutdown execution unit 12, and starts performing the hardware shutdown process so that each of the hardware components is inactivated according to the predetermined sequence and the power supply of the image forming apparatus 1 is shut down. Namely, when the shutdown timer has expired, the state management unit 23 starts performing the hardware shutdown process regardless of whether the software shutdown process is in progress.

In the image forming apparatus 1 having the above-described functions, when the power switch is pressed during the energy saving mode, the shutdown confirmation screen in which the user is prompted to determine whether performance of the shutdown process is to be continued may be displayed. When a user's operation to continue performance of the shutdown process is received through the shutdown confirmation screen, the image forming apparatus 1 is controlled to perform the hardware shutdown process. Hence, the image forming apparatus 1 is able to prevent the hardware shutdown operation from being started due to the misoperation (i.e., accidentally pressing the power switch during the energy saving mode). In addition, each of the above-described functions of the image forming apparatus 1 according to the embodiment may be implemented by all or a part of the kernel 20.

Figure 4:
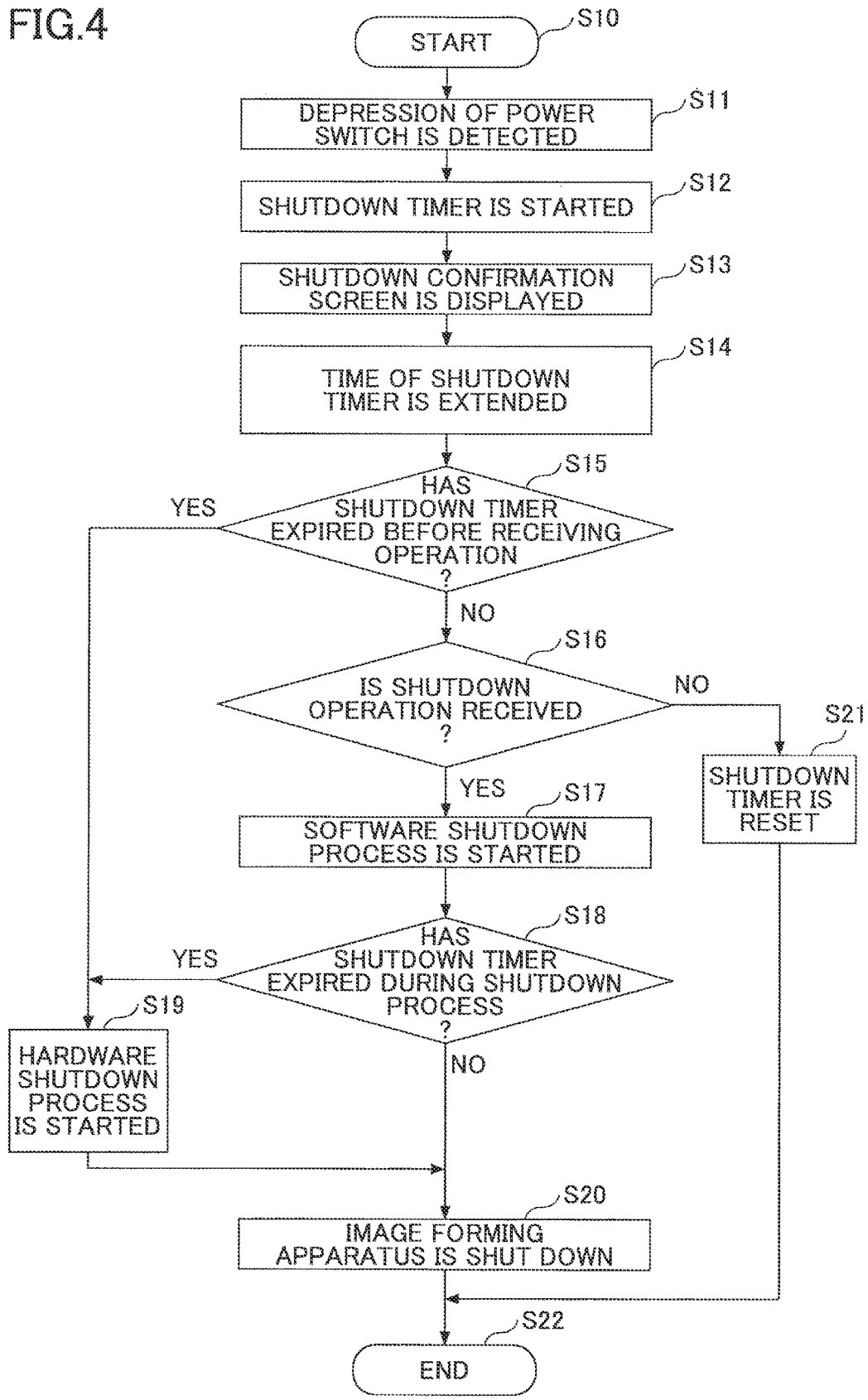
FIG. 4 is a flowchart for explaining a shutdown process control procedure performed by the image forming apparatus according to the embodiment.

FIG. 4 is a flowchart for explaining a shutdown process control procedure performed by the image forming apparatus 1 according to the embodiment.

At step S10, the shutdown process control procedure is started when the image forming apparatus 1 shifts to the energy saving mode.

At step S11, the detection unit 21 detects a depression of the power switch by the user.

At step S12, the shutdown timer management unit 22 starts operation of the shutdown timer.

At step S13, the display unit 11 displays the shutdown confirmation screen in which the user is prompted to determine whether the shutdown process is to be continued.

At step S14, the shutdown timer management unit 22 extends a time (timer value) of the shutdown timer.

At step S15, the state management unit 23 determines whether the shutdown timer has expired before receiving a user's operation through the shutdown confirmation screen. In this connection, the shutdown confirmation screen is displayed continuously until the shutdown timer expiration.

When the shutdown timer has not expired before receiving a user's operation (NO in step S15; or when a user's operation is received before the shutdown timer has expired), the procedure progresses to step S16. On the other hand, when the shutdown timer has expired before receiving a user's operation (YES in step S15), the procedure progresses to step S19.

At step S16, the display unit 11 determines whether a user's operation to continue performance of the shutdown process is received. When the user's operation to continue performance of the shutdown process is received (YES in step S16), the procedure progresses to step S17. On the other hand, when a user's operation to discontinue performance of the shutdown process is received (NO in step S16), the procedure progresses to step S21.

At step S17, the shutdown execution unit 12 starts performing the software shutdown process.

At step S18, the shutdown timer management unit 22 determines whether the shutdown timer has expired during the software shutdown process. When the shutdown timer has expired during the software shutdown process (YES in step S18), the procedure progresses to step S19. On the other hand, when the shutdown timer has not expired during the software shutdown process (NO in step S18), the procedure progresses to step S20.

At step S19, the software shutdown process by the shutdown execution unit 12 is interrupted or remains unfinished, and the state management unit 23 starts performing the hardware shutdown process so that each of the hardware components is stopped.

At step S20, the power supply of the image forming apparatus 1 is shut down. Then, the shutdown process control procedure is terminated at step S22.

As described above, when the user's operation to discontinue performance of the shutdown process is received (NO in step S16), the procedure proceeds to step S21. At step S21, the display unit 11 resets or stops the shutdown timer. Then, the shutdown process control procedure is terminated at step S22.

In addition, all or a part of the above-described functions of the image forming apparatus 1 according to the embodiment may be implemented by a computer program including instructions for execution by a processor, such as the CPU 103 in FIG. 1. The program may be stored in a removable recording medium, such as the recording medium 122 in FIG. 1. The removable recording medium may be understood as a non-transitory computer-readable recording medium. Examples of the removable recording medium may include a magnetic recording medium, an optical disk, a magneto-optical recording medium, a nonvolatile memory, etc. The program read from the removable recording medium to the RAM 101, when executed by the processor, causes the processor to carry out all or a part of the above-described functions of the image forming apparatus 1 according to the embodiment.

As described in the foregoing embodiments, the information processing apparatus according to the invention is capable of preventing the hardware shutdown process from being started due to the misoperation during the energy saving mode or the like.

The information processing apparatus according to the invention is not limited to the above-described embodiments, and variations and modifications may be made without departing from the scope of the present invention.

The present application is based upon and claims the benefit of priority of Japanese Patent Application No. 2014-107157, filed on May 23, 2014, the contents of which are incorporated herein by reference in their entirety.

What is claimed is:

1. An information processing apparatus comprising:
a processor configured to shift to an energy saving mode in which predetermined functions are inactivated, the processor including:
a detection unit configured to detect, in the energy saving mode of the information processing apparatus, a depression of a power switch;
an operation reception unit configured to display, when the depression of the power switch is detected, a selection screen in which a user is prompted to determine whether performance of a shutdown of the information processing apparatus is to be continued, the operation reception unit receiving a selection operation by the user through the selection screen to continue performance of the shutdown process; and
a shutdown unit configured to perform the shutdown process of the information processing apparatus; and
a timer starting unit configured to start a timer when the depression of the power switch is detected by the detection unit, the timer being configured to trigger the shutdown unit to start performance of the shutdown process when the timer has expired,
wherein the information processing apparatus is shut down by the shutdown unit when the selection operation to continue performance of the shutdown process is received by the operation reception unit, or when the selection operation to continue performance of the shutdown process is not received by the operation reception unit but the timer has expired, and wherein the processor further includes a timer value change unit configured to change a value of the timer when the selection screen is displayed by the operation reception unit.

2. The information processing apparatus according to claim 1, wherein the timer value change unit resets the value of the timer when an operation to discontinue performance of the shutdown process is received by the operation reception unit.

3. The information processing apparatus according to claim 1,
wherein the information processing apparatus is an image forming apparatus, and the image forming apparatus includes an operation panel configured to receive from a user an operation including an image formation operation and to display a variety of information items,
wherein the operation panel is turned off when the image forming apparatus is in the energy saving mode, and
when a depression of the power switch is detected while the operation panel is in an off state, the selection screen is displayed on the operation panel and the timer is started, and
the image forming apparatus is shut down by the shutdown unit when the selection operation to continue performance of the shutdown process is received by the operation panel, or when the selection operation to continue performance of the shutdown process is not received by the operation panel but the timer has expired.

4. An information processing method by an information processing apparatus configured to shift to an energy saving mode in which predetermined functions are inactivated, the method comprising:
detecting, by the information processing apparatus in the energy saving mode of the information processing apparatus, depression of a power switch of the information processing apparatus;
displaying, when the depression of the power switch is detected, a selection screen in which a user is prompted to determine whether performance of a shutdown process of the information processing apparatus is to be continued;
starting a timer when the depression of the power switch is detected, the timer being configured to trigger a start of performance of the shutdown process when the timer has expired; changing a value of the timer when the selection screen is displayed;
receiving a selection operation by the user through the selection screen to continue performance of the shutdown process; and
starting performance of the shutdown process when the selection operation to continue performance of the shutdown process is received, or when the selection operation to continue performance of the shutdown process is not received but the timer has expired.

5. A non-transitory computer-readable recording medium having stored therein a program that when executed by a computer causes the computer to perform an information processing method comprising:
detecting a depression of a power switch in an energy saving mode of an information processing apparatus, the information processing apparatus being configured to shift to the energy saving mode in which predetermined functions are inactivated;
displaying, when the depression of the power switch is detected, a selection screen in which a user is prompted to determine whether performance of a shutdown process of the information processing apparatus is to be continued;
starting a timer when the depression of the power switch is detected, the timer being configured to trigger a start of performance of the shutdown process when the timer has expired; changing a value of the timer when the selection screen is displayed;
receiving a selection operation by the user through the selection screen to continue performance of the shutdown process; and
starting performance of the shutdown process when the selection operation to continue performance of the shutdown process is received, or when the selection operation to continue performance of the shutdown process is not received but the timer has expired.

* * * * *